United States Patent [19]

Pfitzenmaier

[11] Patent Number: 5,256,600

[45] Date of Patent: Oct. 26, 1993

[54] GLASS-CERAMICS AND COLOR METHODS

[75] Inventor: Robert W. Pfitzenmaier, Canisteo, N.Y.

[73] Assignee: Corning Incorporated, Corning, N.Y.

[21] Appl. No.: 919,592

[22] Filed: Jul. 24, 1992

[51] Int. Cl.$^5$ ............................................. C03L 10/14
[52] U.S. Cl. ........................................ 501/4; 501/69; 501/71
[58] Field of Search .................. 501/4, 69, 71

[56] References Cited

U.S. PATENT DOCUMENTS

| | | | |
|---|---|---|---|
| 3,663,245 | 5/1972 | Bryson | 106/52 |
| 3,788,865 | 1/1974 | Babcock et al. | 106/39.7 |
| 4,018,612 | 4/1977 | Chyung | 106/39.7 |
| 4,461,839 | 7/1984 | Rittler | 501/4 |
| 4,526,872 | 7/1985 | Andrieu et al. | 501/4 |
| 4,940,674 | 7/1990 | Beall et al. | 501/4 |
| 5,070,043 | 12/1991 | Amundson, Jr. et al. | 501/3 |
| 5,070,045 | 12/1991 | Comte et al. | 501/4 |
| 5,179,045 | 1/1993 | Aitken et al. | 501/4 |

*Primary Examiner*—Karl Group
*Attorney, Agent, or Firm*—Milton M. Peterson

[57] ABSTRACT

A method of varying the color in a glass-ceramic material having a beta-quartz solid solution as the predominant crystal phase which comprises controlling the $Al_2O_3$ level between 19 and 20% by weight, the $Fe_2O_3$ level between 700 and 900 ppm and the $Co_3O_4$ level between not over 15 ppm and 140 ppm. An amber color is obtained with 20–40 ppm $Co_3O_4$ and a burgundy color with 120–140 ppm $Co_3O_4$. $Co_3O_4$ in a compatible carrier may be added to molten glass as a forehearth additive.

15 Claims, 1 Drawing Sheet

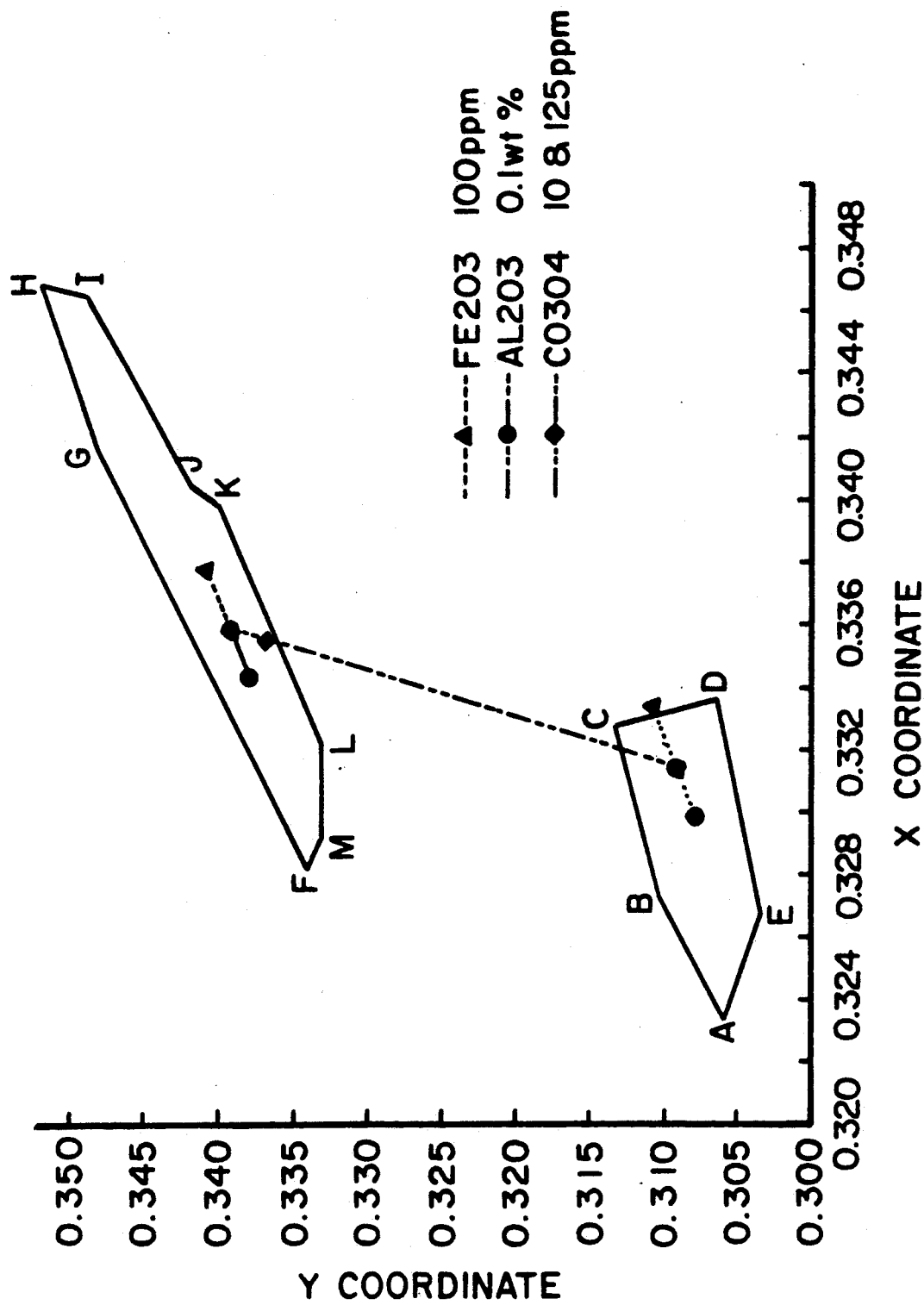

GLASS-CERAMICS AND COLOR METHODS

FIELD OF THE INVENTION

The field is glass-ceramic materials and methods of producing and controlling colors therein.

BACKGROUND OF THE INVENTION

A glass-ceramic is a material having at least one crystalline phase thermally developed in a uniform pattern throughout at least a portion of a glass precursor. Glass-ceramics have been known for over 30 years since being described in U.S. Pat. No. 2,920,971 (Stookey). They find application in diverse areas, an area of particular interest being the fabrication of articles used in the preparation and serving of food. Such articles include cookware, bakeware, tableware and flat cooktops.

In general, production of a glass-ceramic material involves three major steps: melting a mixture of raw materials, usually containing a nucleating agent, to produce a glass; forming an article from the glass and cooling the glass below its transformation range; crystallizing ("ceramming") the glass article by an appropriate thermal treatment. The thermal treatment usually involves a nucleating step at a temperature slightly above the transformation range, followed by heating to a somewhat higher temperature to cause crystal growth on the nuclei.

Crystallization of glasses in the $Li_2O-Al_2O_3-SiO_2$ composition field generally provides highly crystallized glass-ceramics. The primary crystal phase, depending on glass composition and heat treatment, may be a transparent beta-quartz solid solution, or an opaque beta-spodumene solid solution.

Beta-quartz is the hexagonal trapezohedral modification of $SiO_2$. It exhibits a slightly negative coefficient of thermal expansion (CTE). This makes it of particular interest where thermal cycling occurs, as in cookware. The basis of the beta-quartz solid solution is believed to be the substitution of $Al^{+3}$ ions for some of the $Si^{+4}$ ions in the beta-quartz structure. The attendant charge deficiency is made up by the introduction of a small ion, such as $Li^+$, $Mg^{+2}$, or $Zn^{+2}$, into the beta-quartz structure.

Beta-quartz solid solution glass-ceramics customarily contain $TiO_2$ as a nucleating agent. Optionally, the $TiO_2$ may be partially, or wholly, substituted for by $ZrO_2$. The appearance of such glass-ceramics can be varied by varying composition and/or heat treatment. Thus, transparent, translucent, or opaque glass-ceramics, which may be water-white, translucent, opaque white, or variously colored, are all possibilities as described in the prior art.

The widest use of $Li_2O-Al_2O_3-SiO_2$ glass-ceramic materials has been in the field of culinary ware. For over three decades, Corning Glass Works, now Corning Incorporated, has marketed opaque white cooking utensils under the trademark CORNING WARE. More recently, cooking utensils, formed from a transparent glass-ceramic exhibiting a light brown tint, were introduced commercially by Corning France, S.A. under the trademark VISION. In general, this transparent glass-ceramic is crystallized at lower temperatures to develop small, beta-quartz solid solution crystals. Such glass-ceramics and their production are described, for example, in U.S. Pat. Nos. 4,018,612 and 4,526,872.

It has been observed that transparent, beta-quartz glass-ceramics nucleated with $TiO_2$ tend to exhibit a light brown tint. This is ascribed to the presence of both $TiO_2$ and $Fe_2O_3$ in the parent glass composition. Efforts have, therefore, been made to either develop a decolorizer or to mask the tint. In an opaque, white glass-ceramic, the brown tint is effectively masked. Masking, however, becomes more difficult in transparent glass-ceramics.

The present invention arises from a desire to achieve a decorative color in a transparent, beta-quartz solid solution glass-ceramic. This goes beyond simply neutralizing the inherent brown tint. In addition to achieving the desired coloration, production demands that it be done while maintaining a certain degree of infra-red transmission in the molten glass. This is necessary to adequately retain heat in the glass during the forming process. Heretofore, this has been accomplished by maintaining the $Fe_2O_3$ level in the composition at a small, but reasonably critical, amount.

It is apparent then that any effort at achieving a controlled color in a transparent, beta-quartz solid solution glass-ceramic must take into consideration the inherent color effects of $TiO_2$ and $Fe_2O_3$. It is known, of course, that color may be imparted to a glass by incorporating one or more colorants, usually transition metal oxides, in the precursor glass. However, the color in a parent glass may change markedly during the ceramming step. Therefore, the ultimate glass-ceramic color is often not predictable from the initial glass color.

U.S. Pat. No. 5,070,045 (Comte et al.) discloses transparent glass-ceramic plates that use 0.1–1.0% of a colorant selected from CoO, NiO, $Cr_2O_3$, $Fe_2O_3$, $MnO_2$, and $V_2O_5$. The patent is primarily concerned with $V_2O_5$ which is taught to contribute to minimal distortion while giving a black aspect in reflection and a reddish brown tint in transmission. The predominant crystal phase in the glass-ceramics is $\beta$-quartz solid solution. Their compositions consist essentially, in weight percent, as calculated on the oxide basis, of:

| | | | |
|---|---|---|---|
| $SiO_2$ | 65–70 | MgO + BaO + SrO | 1.1–2.3 |
| $Al_2O_3$ | 18–19.8 | $ZrO_2$ | 1.0–2.5 |
| $Li_2O$ | 2.5–3.8 | $As_2O_3$ | 0–1.5 |
| MgO | 0.55–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.4–1.4 | $\dfrac{2.8\ Li_2O + 1.2\ ZnO}{5.2\ MgO}$ | >1.8 |

U.S. Pat. No. 5,179,045 (Aitken et al.) describes production of a burgundy color in a glass-ceramic having as its primary crystal phase a beta-quartz solid solution. The glass-ceramic contains up to 6% $TiO_2$ as a nucleating agent, and has a color package composed of 50–150 ppm $Co_3O_4$, 50–250 ppm NiO and 400–1000 ppm $Fe_2O_3$ to provide the desired burgundy color.

The color package described in this pending application has been the basis of commercial cookware available from Corning Incorporated that has a burgundy color. It would, of course, be desirable to obtain the different colors, as well as the opaque product, with a single base glass composition for the precursor glass. That would facilitate changing from one product to another with a single melting unit. Even more desirable would be the ability to melt one precursor base glass and then provide subsequent treatments to achieve the different colors. It is a primary purpose of this invention to meet these desirable ends.

SUMMARY OF THE INVENTION

In fulfillment of this and other purposes that will be apparent, my invention resides in part in a method of producing a glass-ceramic that is capable of having a variety of colors induced therein which comprises formulating and mixing a batch for a base glass that is capable of being thermally crystallized to a glass-ceramic having a beta-quartz solid solution as a predominant crystal phase, including $TiO_2$, $Al_2O_3$ and $Fe_2O_3$ in the batch, the $TiO_2$ being present in an amount effective as a nucleating agent up to about 6% and the $Al_2O_3$ and $Fe_2O_3$ being controlled between 19 and 20% and 700–900 ppm, respectively, melting the batch in a melting unit, delivering the molten glass through a forehearth, and incorporating $Co_3O_4$ in an amount less than 15 ppm up to 140 ppm.

The invention further resides in a method of varying the color in a glass-ceramic material having beta-quartz solid solution as the predominant crystal phase which comprises controlling the $Al_2O_3$ level between 19 and 20%, the $Fe_2O_3$ level between 700 and 900 ppm and the $Co_3O_4$ level between less than 15 ppm and 140 ppm.

Another aspect of the invention contemplates a colored, transparent glass-ceramic having a beta-quartz solid solution as its primary crystal phase, containing an amount of $TiO_2$ effective as a nucleating agent up to about 6%, and having a color package composed of 20–140 ppm $Co_3O_4$, 700–900 ppm $Fe_2O_3$ and 19–20% $Al_2O_3$.

PRIOR ART

In addition to the patents mentioned in the Background section, attention is also directed to the following United States patents:

U.S. Pat. No. 3,663,245 (Bryson) discloses a forehearth color concentrate comprising a non-smelted, intimate mixture of a flux with one or more colorants. Suitable fluxes are listed as alkali borates, boric acid, alkali phosphates, orthophosphoric acid, alkali silicates, fluosilicic acid, alkali fluorides, alkali salts, alkali hydroxides and mixtures. Suitable color-inducing metals are listed as chromium, copper, iron, cobalt, manganese, vanadium, nickel, uranium, cerium, cerium-titanium, selenium and some rare earth metals.

U.S. Pat. No. 3,788,865 (Babcock et al.) and a division of that patent, U.S. Pat. No. 4,192,688, disclose $Li_2O$-$Al_2O_3$-$SiO_2$ glass-ceramics containing a variety of different oxide glass colorants, including $NiO$, $Cr_2O_3$, $Fe_2O_3$, $MnO$, $Co_3O_4$ and $V_2O_5$, individually or in combination. The color in the glass-ceramic differs from that in the precursor glass, and may vary in the glass-ceramic depending on the heat treatment.

U.S. Pat. No. 4,461,839 (Rittler) discloses transparent, translucent, or opaque glass-ceramics that have a beta-quartz crystal phase. They exhibit colors varying from black to brown to red and contain 0.05–0.2% $Fe_2O_3$, 2.5–6% $TiO_2$ and 0.3–3% of at least two oxides selected from 0–2% $CaO$, 0–3% $CeO_2$, 0–1% $NiO$, 0–1.5% $SnO_2$, 0–0.3% $V_2O_5$ and 0–1% $WO_3$.

U.S. Pat. No. 4,526,872 (Andrieu et al.) discloses a $TiO_2$-nucleated, beta-quartz glass-ceramic having a light brown tint supplied by $Fe_2O_3$, $CoO$ and $Cr_2O_3$ with $MnO_2$ and $V_2O_5$ optional.

U.S. Pat. No. 4,940,674 (Beall et al.) adds 25–250 ppm $Cr_2O_3$ to a beta-quartz glass-ceramic to reduce haze. $Co_3O_4$ and $Fe_2O_3$ are then added to provide a neutral color.

U.S. Pat. No. 5,070,043 (Amundson, Jr. et al.) discloses a color package to provide a light beige color in a potassium fluorrichterite glass-ceramic. The package includes 0.065–0.16% $Fe_2O_3$, 0.055–0.16% $NiO$, 0.0015–0.0029% Se and 0–0.0014% $Co_3O_4$, the latter controlling brightness if present.

BRIEF DESCRIPTION OF THE DRAWING

The single FIGURE in the accompanying drawing is a graphical representation of chromaticity coordinates x and y (Illuminant C). The FIGURE further shows, by vectors, the trends resulting from increasing individual colorant contents in accordance with the invention.

DESCRIPTION OF THE INVENTION

My invention is based in large measure on my discovery of a unique color package for a transparent, beta-quartz solid solution glass-ceramic. The term color package indicates a combination of certain glass colorants, usually transition metal oxides, in certain proportions to either produce, or control production of, particular colors in a material. In this case, the material is a beta-quartz solid solution glass-ceramic.

My unique color package consists of cobalt oxide ($Co_3O_4$), iron oxide ($Fe_2O_3$) and alumina ($Al_2O_3$) in the presence of the nucleating agent titania ($TiO_2$). My package is unique in that at least three existing commercial products of distinctly different appearance can be essentially duplicated in a common base glass and glass-ceramic composition. This is accomplished by shifting the $Co_3O_4$ level in the package while maintaining the $Fe_2O_3$ and $Al_2O_3$ contents at fixed levels. These levels are in the ranges of 700–900 ppm $Fe_2O_3$ and 19–20% $Al_2O_3$.

Thus, the appearance of the opaque white cookware, known under the CORNING WARE trademark, can be essentially duplicated by maintaining the $Co_3O_4$ level less than about 15 ppm. Larger amounts contribute to an undesirable grey color in the opaque glass-ceramic.

Ideally, of course, $Co_3O_4$ would be avoided completely, that is maintained at zero. However, that is generally not feasible, especially since cullet containing cobalt must be used in melting the base glass. This latter condition will become obvious with further description of the invention.

The precursor glass of the beta-quartz solid solution glass-ceramic is rendered opaque by crystallizing at a relatively high temperature. Thereby, the crystals grow larger to the point where they scatter light, thus rendering the material opaque. The same base glass, when cerammed at a lower temperature, is transparent.

I have found that, if the $Co_3O_4$ content in a transparent beta-quartz solid solution glass-ceramic is maintained in the range of 20–40 ppm, a color essentially matching the amber color of the VISIONS® cookware product may be obtained.

Finally, I have found that the burgundy color, characteristic of the commercial product of the pending Aitken et al. application, can also be matched. This is accomplished by substantially increasing the $Co_3O_4$ content into the range of 120–140 ppm in the precursor glass of the beta-quartz glass-ceramic while maintaining all other components constant.

The color packages just described may be introduced by incorporating components in their entirety in the batch fed to a melting unit. However, a real advantage is obtained by using a forehearth colorant additive system sometimes referred to as a colorcell.

The method and equipment used to add a colorant material to a molten glass in a forehearth is referred to as a forehearth coloring system or a colorcell. Such systems (colorcells) have been in use for at least 30 years. They have been used primarily, however, to impart colors to soda lime glasses, in particular, green or blue colors to soda lime glass bottles. Currently, colorcells are employed to introduce two types of glass colorants: Unmelted concentrated colorant in particulate form and melted color frits. The former is favored in the United States, while the latter is more popular in Europe.

Initially, it was recognized that any color obtained in the precursor glass would not be retained in the crystallized, glass-ceramic state. Further, it was necessary to work within the confines of two other requirements. First, the glass composition would contain, as a nucleating agent, titania ($TiO_2$), whereby a brown tint would be imparted to the resulting glass-ceramic. Second, the iron oxide ($Fe_2O_3$) would range from at least 400 ppm up to about 1000 ppm. This assures adequate infra-red radiation control to facilitate heat retention in the glass melt during the forming process.

Working within these limitations, I explored the coloring effects obtainable by adding known glass colorants to the precursor glass batch. These were added, either alone or in combinations. The resulting glass was then crystallized to the glass-ceramic state. These melting expeditions led to the discovery of color packages that required variation in only one colorant, cobalt oxide. As described earlier, this necessitated tight control on the iron oxide and alumina contents. However, it greatly simplified the forehearth colorcell procedure since only one colorant had to be added by that procedure.

In the accompanying drawing, the single FIGURE is a graphical representation of the invention employing the CIE chromaticity coordinate system. In the FIGURE, x coordinates are plotted on the horizontal axis and y coordinates are plotted on the vertical axis. The polygon ABCDEA encompasses coordinate value combinations that provide generally acceptable burgundy colors in accordance with the invention. The color coordinate value ranges for this area are:

x=0.3230 to 0.3340
y=0.3030 to 0.3120

The polygon FGHIJKLMF encompasses coordinate value combinations that represent the target area for the desired amber color for a cooking vessel. The color coordinate value ranges for this target area are:

x=0.3280 to 0.3460
y=0.3320 to 0.3520

The straight dotted line between the two polygons depicts the color coordinate path as $Co_3O_4$ additive is increased from a target value of 25 ppm to a target value of 150 ppm. The target values are shown by solid squares. The values for $Fe_2O_3$ and $Al_2O_3$ at these points are 800 ppm and 19.5%.

A base glass, used in studies leading to the present invention, was selected to provide various physical properties already established in connection with the commercial glass-ceramics being matched and potentially replaced. The glass selected had the following composition as calculated in approximate weight percent on an oxide basis:

| | | | |
|---|---|---|---|
| $SiO_2$ | 68.3 | BaO | 0.80 |
| $Al_2O_3$ | 19.5 | $As_2O_3$ | 0.75 |
| $Li_2O$ | 3.45 | $TiO_2$ | 2.60 |
| MgO | 1.20 | $ZrO_2$ | 1.70 |
| ZnO | 1.60 | $Fe_2O_3$ | 800 ppm. |

A survey of my experimental data indicates certain trends that occur as the contents of the oxides influencing color are varied in the base glass. These trends are shown by vectors in the FIGURE of the drawing. A legend indicates the direction and magnitude of change in the color coordinates that may be made by changes in $Co_3O_4$, $Fe_2O_3$ and $Al_2O_3$ contents. TABLE I below also shows these changes. A minus sign indicates a movement to the left of the x-coordinate, and a plus sign a movement to the right. Likewise, a minus sign means a movement down on the y-coordinate, and a plus sign a movement up.

TABLE I

| Oxide | Concentration | Color Coordinates | | |
|---|---|---|---|---|
| | | x | y | Y |
| $Co_3O_4$ | 10 ppm | −0.0004 | −0.0024 | −1.5 |
| | 100 ppm | −0.0042 | −0.0240 | −15.0 |
| $Fe_2O_3$ | 10 ppm | +0.0002 | +0.0002 | — |
| | 100 ppm | +0.0020 | +0.0017 | −0.8 |
| $Al_2O_3$ | 0.1 wt % | −0.0015 | −0.0013 | +0.5 |

It will be appreciated that vector values are for the base glass shown. Microstructure changes in different compositions can impart both direction and magnitude of the vector values. Therefore, experimental checking will be necessary if a substantial change is made in the base glass.

When forehearth additions are made, I prefer the unmelted, that is, bonded oxide, form. A batch for this purpose will include oxides, or oxide sources, in proportions compatible with the base glass from the melting unit. It will further include the colorant, $C_3O_4$, in a predetermined amount sufficient to provide a desired color in the ultimate glass-ceramic. The batch may be prepared in granular form in any known manner, other than melting. The particle size may be +30 mesh (0.6 Mm) and under ⅜ inch (1 cm).

For the amber colored glass-ceramic, I employ a composition which, in weight percent on an oxide basis, consists of $SiO_2$ 54%, $TiO_2$ 12%, ZnO 12%, $Na_2O$ 20% and $Co_3O_4$ 2%. This is fed to the forehearth at a rate to provide 0.5 grams of additive per 1000 grams of glass batch fed to the melting unit.

For the burgundy colored glass-ceramic, I employ a composition which, in weight percent on an oxide basis, consists of $SiO_2$ 52%, $B_2O_3$ 3%, $Na_2O$ 15% and $Co_3O_4$ 30%. This is fed to the forehearth at a rate of 0.5 grams per 1000 grams of glass batch. In each example, the base glass melted in the melting unit will have a content of 15 ppm of $Co_3O_4$. This is the amount acceptable in a glass to be crystallized to an opaque white glass-ceramic, such glass having no forehearth additive.

I claim:

1. A method of producing a glass-ceramic that is capable of having a variety of colors induced therein which comprises formulating and mixing a batch for a base glass that is capable of being thermally crystallized to a glass-ceramic having a beta-quartz solid solution as a predominant crystal phase, including $TiO_2$ in the batch in an amount effective as a nucleating agent and sufficient to provide up to about 6% in the glass including $Al_2O_3$, $Fe_2O_3$, and $Co_3O_4$ in the glass batch in amounts sufficient to provide 19–20% $Al_2O_3$, 700–900 ppm $Fe_2O_3$, and not over 15 pp. $Co_3O_4$ in the glass, melting the batch in a melting unit, and delivering the molten glass through a forehearth.

2. A method in accordance with claim 1 which further comprises adding $Co_3O_4$ to the molten glass as it passes through the forehearth from the melting unit.

3. A method in accordance with claim 2 wherein the amount of $Co_3O_4$ added to the glass in the forehearth is sufficient to provide a $Co_3O_4$ level of 20–40 ppm in the glass.

4. A method in accordance with claim 2 wherein the amount of $Co_3O_4$ added to the glass in the forehearth is sufficient to provide a $Co_3O_4$ level of 120–140 ppm in the glass.

5. A method in accordance with claim 2 wherein the $Co_3O_4$ to be added to the glass in the forehearth is mixed with a carrier that is compatible with the base glass.

6. A method in accordance with claim 1 wherein all of the glass-ceramic constituents are introduced in their entirety in the batch mixed for melting.

7. A method of producing a variety of colored glass-ceramic products which comprises melting a base glass that is capable of being thermally crystallized to a glass-ceramic having a beta-quartz solid solution as a predominant crystal phase, the base glass composition including 19–20% $Al_2O_3$, 700–900 ppm $Fe_2O_3$, and $TiO_2$, the $TiO_2$ being in an amount effective as a nucleating agent, but not over 6%, incorporating $Co_3O_4$ in the base glass, and thermally crystallizing the glass to a glass-ceramic having a beta-quartz solid solution as a primary crystal phase, the amount of $Co_3O_4$ incorporated in the glass determining the color of the glass-ceramic.

8. A method in accordance with claim 7 wherein the $Co_3O_4$ level incorporated in the glass ranges between 20 and 40 ppm to provide an amber color in a transparent glass-ceramic.

9. A method in accordance with claim 7 wherein the $Co_3O_4$ level incorporated in the glass ranges between 120 and 140 ppm to provide a burgundy color in a transparent glass-ceramic.

10. A method in accordance with claim 7 wherein the $Co_3O_4$ level is incorporated in the glass at not over 15 ppm and the glass-ceramic is opaque.

11. A colored, transparent glass-ceramic having a beta-quartz solid solution as its primary crystal phase, containing an amount of $TiO_2$ effective as a nucleating agent up to about 6%, and having a color package composed of 20–140 ppm $Co_3O_4$, 700–900 ppm $Fe_2O_3$ and 19–20% $Al_2O_3$.

12. A glass-ceramic in accordance with claim 11 wherein the content of $Co_3O_4$ is 20–40 ppm and the glass-ceramic has an amber color.

13. A glass-ceramic in accordance with claim 11 wherein the content of $Co_3O_4$ is 120–140 ppm and the glass-ceramic has a burgundy color.

14. A glass-ceramic in accordance with claim 11 having a composition consisting essentially of, as calculated on the oxide basis in percent by weight,

| | | | |
|---|---|---|---|
| $SiO_2$ | 60–70 | $ZrO_2$ | 1.0–2.5 |
| $Al_2O_3$ | 19–20 | $As_2O_3$ | 0–1.5 |
| $Li_2O$ | 2.5–3.8 | $Sb_2O_3$ | 0–1.5 |
| MgO | 0.5–1.5 | $As_2O_3 + Sb_2O_3$ | 0.5–1.5 |
| ZnO | 1.2–2.8 | $Na_2O$ | 0–<1 |
| $TiO_2$ | 1.8–6.0 | $K_2O$ | 0–<1 |
| BaO | 0–1.4 | $Na_2O + K_2O$ | 0–<1 |
| SrO | 0–1.4 | $Fe_2O_3$ | 700–900 ppm |
| BaO + SrO | 0.4–1.4 | $Co_3O_4$ | 20–140 ppm |
| MgO + BaO + SrO | 1.1–2.3. | | |

15. A glass-ceramic in accordance with claim 14 having a composition consisting essentially of,

| | | | |
|---|---|---|---|
| $SiO_2$ | 68.3 | $As_2O_3$ | 0.75 |
| $Al_2O_3$ | 19.5 | $TiO_2$ | 2.6 |
| $Li_2O$ | 3.45 | $ZrO_2$ | 1.7 |
| MgO | 1.2 | $Fe_2O_3$ | 800 ppm |
| ZnO | 1.6 | $Co_3O_4$ | 30 or 130 ppm |
| BaO | 0.8. | | |

* * * * *